US006364223B2

(12) United States Patent
Linde et al.

(10) Patent No.: US 6,364,223 B2
(45) Date of Patent: *Apr. 2, 2002

(54) PROCESS FOR PRODUCING BRIQUETTED AND PRESSED GRANULAR MATERIAL AND USE THEREOF

(75) Inventors: Günter Linde; Olaf Schmidt-Park, both of Krefeld; Manfred Eitel, Kempen; Lothar Steiling, Leverkusen, all of (DE)

(73) Assignee: Bayer Aktiengesellschaft (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/828,384

(22) Filed: Apr. 6, 2001

Related U.S. Application Data

(63) Continuation of application No. 09/505,041, filed on Feb. 16, 2000, which is a continuation of application No. 08/827,660, filed on Apr. 10, 1997, now Pat. No. 6,079,644.

(30) Foreign Application Priority Data

Apr. 18, 1996 (DE) .......................................... 196 15 261
Sep. 18, 1996 (DE) .......................................... 196 38 042

(51) Int. Cl.⁷ ................................................ B09C 3/00
(52) U.S. Cl. ............................................. 241/3; 241/22
(58) Field of Search ........................... 241/3, 5, 21, 22, 241/24.1

(56) References Cited

U.S. PATENT DOCUMENTS

| | | |
|---|---|---|
| 1,972,207 A | 9/1934 | Tucker et al. |
| 1,972,208 A | 9/1934 | Tucker et al. |
| RE20,776 E | 7/1938 | Amon |
| 2,141,569 A | 12/1938 | Tucker et al. |
| 2,167,432 A | 7/1939 | Cox et al. |
| 2,221,175 A | 11/1940 | Bechtold |
| 2,491,832 A | 12/1949 | Salvesen et al. |
| 2,690,398 A | 9/1954 | Guertler et al. |
| 2,872,329 A | 2/1959 | Scripture, Jr et al. |
| 3,068,109 A | 12/1962 | Rodeffer |
| 3,117,882 A | 1/1964 | Gerschker et al. |
| 3,448,096 A | 6/1969 | Read et al. |
| 3,615,809 A | 10/1971 | Nagle et al. |
| 3,617,358 A | 11/1971 | Dittrich |
| 3,720,528 A | 3/1973 | Jordan |
| 3,764,362 A | 10/1973 | Hinley et al. |
| 3,773,536 A | 11/1973 | Batten et al. |
| 3,808,192 A | 4/1974 | Dimitri |
| 3,836,378 A | 9/1974 | Hahnkamm et al. |
| 3,843,380 A | 10/1974 | Beyn |
| 3,941,315 A | 3/1976 | Gribble et al. |
| 3,969,457 A | 7/1976 | Paris |
| 4,015,999 A | 4/1977 | Robertson et al. |
| 4,055,439 A | 10/1977 | Babler et al. |
| 4,127,421 A | 11/1978 | Ferrill, Jr. |
| 4,134,725 A | 1/1979 | Buchel et al. |
| 4,154,622 A | 5/1979 | Momoi et al. |
| 4,175,976 A | 11/1979 | Avera |
| 4,177,082 A | 12/1979 | Robertson |
| 4,188,231 A | 2/1980 | Valore |
| 4,226,370 A | 10/1980 | Watsib |
| 4,250,027 A | 2/1981 | Cases et al. |
| 4,254,201 A | 3/1981 | Sawai et al. |
| 4,255,375 A | 3/1981 | Macpherson et al. |
| 4,261,966 A | 4/1981 | Portes et al. |
| 4,264,552 A | 4/1981 | McMahon et al. |
| 4,277,288 A | 7/1981 | Lawrence et al. |
| 4,285,994 A | 8/1981 | Pearce et al. |
| 4,298,399 A | 11/1981 | Formica et al. |
| 4,308,073 A | 12/1981 | Mills |
| 4,310,483 A | 1/1982 | Dorfel et al. |
| 4,366,139 A | 12/1982 | Kuhner et al. |
| 4,450,106 A | 5/1984 | Forss |
| 4,464,203 A | 8/1984 | Belde et al. |
| 4,494,994 A | 1/1985 | Cioca et al. |
| 4,527,746 A | 7/1985 | Molls et al. |
| 4,671,464 A | 6/1987 | Karra et al. |
| 4,704,230 A | 11/1987 | Blackmore |
| 4,725,317 A | 2/1988 | Wheeler |

(List continued on next page.)

FOREIGN PATENT DOCUMENTS

| | | |
|---|---|---|
| DE | 1807714 | 6/1970 |
| DE | 31 32 303 | 2/1983 |
| DE | 3619363 | 8/1990 |
| DE | 3918694 | 11/1990 |
| DE | 3841848 | 7/1991 |
| DE | 4214195 | 2/1995 |
| DE | 4336612 | 5/1995 |
| DE | 4336613 | 1/1996 |
| EP | 257423 | 3/1989 |
| EP | 268645 | 8/1990 |
| EP | 365046 | 8/1990 |
| EP | 0 424 896 | 5/1991 |
| EP | 482450 | 4/1992 |
| EP | 507046 | 4/1993 |
| EP | 567882 | 11/1993 |
| EP | 606592 | 7/1994 |
| EP | 144940 | 8/1998 |
| GB | 1537663 | 1/1970 |
| JP | 041174549 A | 4/1992 |
| JP | 07069691 A | 3/1995 |
| JP | 07089754 A | 4/1995 |

OTHER PUBLICATIONS

"Sizing Up the Agglomeration Process".

Primary Examiner—Allen Ostrager
Assistant Examiner—William Hong
(74) Attorney, Agent, or Firm—Connolly Bove Lodge & Hutz LLP

(57) ABSTRACT

The present invention relates to a process for producing briquetted and pressed granular material and the use thereof for coloring building materials, such as concrete and asphalt, and organic media, such as paint systems, plastics and colored pastes.

15 Claims, No Drawings

U.S. PATENT DOCUMENTS

| | | |
|---|---|---|
| 4,762,523 A | 8/1988 | Gawol et al. |
| 4,810,305 A | 3/1989 | Braun et al. |
| 4,909,851 A | 3/1990 | Morris et al. |
| 4,946,505 A | 8/1990 | Jungk |
| 4,952,617 A | 8/1990 | Ayala et al. |
| 5,002,609 A | 3/1991 | Rademachers et al. |
| 5,035,748 A | 7/1991 | Burow et al. |
| 5,111,998 A | 5/1992 | Kanda et al. |
| 5,164,007 A | 11/1992 | Buxhaum |
| 5,199,986 A | 4/1993 | Krockert et al. |
| 5,215,583 A | 6/1993 | Krockert et al. |
| 5,215,584 A | 6/1993 | Buxbaum et al. |
| 5,322,563 A | 6/1994 | van Bonn et al. |
| 5,389,137 A | 2/1995 | Linde et al. |
| 5,484,481 A | 1/1996 | Linde et al. |
| 5,597,401 A | 1/1997 | Megy |
| 5,672,432 A | 9/1997 | Harris et al. |
| 6,079,644 A * | 6/2000 | Linde et al. .................... 241/3 |
| 6,241,167 B1 * | 6/2001 | Linde et al. .................... 241/3 |

* cited by examiner

PROCESS FOR PRODUCING BRIQUETTED AND PRESSED GRANULAR MATERIAL AND USE THEREOF

CROSS-REFERENCE TO RELATED APPLICATION

The present application is a continuation of application Ser. No. 09/505,041, filed Feb. 16, 2000, which in turn is a continuation of application Ser. No. 08/827,660, filed Apr. 10, 1997 (now U.S. Pat. No. 6,079,644).

The present invention relates to a process for producing briquetted and pressed granular material and the use thereof for coloring building materials, such as concrete and asphalt, and organic media, such as paint systems, plastics and colored pastes.

The processing of pigment granules requires that the pigments be ground to primary particles in order to achieve the optimal color effect. The resulting powders formed create a large amount of dust and, owing to their finely-divided state, tend to adhere and stick in dosing plants. In the case of toxicologically harmful substances, during the processing precautions must therefore be taken to avoid danger to humans and the environment owing to the dust formed. But even in the case of safe, inert substances such as, for example, iron oxide pigments, avoidance of irritation due to dust is being increasingly demanded by the market.

The aim when handling pigments is accordingly avoidance of dust and improved dosing as a result of good flow properties, in order to achieve a color effect of even quality for use in building materials and organic media. This aim is more or less achieved by applying granulation processes to pigments. Here pelletizing and spray granulation are generally used. Compacting processes have hitherto been less suitable, owing to the limited dispersibility of the granular material obtained thereby.

In principle, in the case of pigments the market demands two diametrically opposing properties for the use of pigment granules: mechanical stability of the granular material and good dispersibility. The mechanical stability is responsible for good transport properties during transport between manufacturer and user as well as for good dosing and flow properties in the pigments in use. It is produced by high adhesive forces and is dependent, for example, on the quantity of binder or even on the compacting pressure during forming. On the other hand, the dispersibility is influenced by a thorough grinding prior to granulation (wet grinding and dry grinding), by the mechanical energy during the incorporation (shear forces) and by dispersing agents, which immediately lower the adhesive forces in the dry granular material during the incorporation into a medium. The use of larger quantities of dispersing agents in pigments is limited, however, owing to the cost ratio of additive to pigment. A high proportion of additive moreover causes a corresponding decrease in the coloring strength or in the scattering power. As the variations in coloring strength are generally less than ± 5%, the use of additives is also restricted even if these are acting simultaneously as adhesion promoters and dispersing agents. Furthermore, the additives must not unfavorably alter the properties in use of end products such as building materials, plastics and paints; for example, the strength or the setting properties in concrete, the compressive strength or abrasion resistance in asphalt and the strength or the notch impact resistance in plastics and the elastic properties in elastomers (polymers).

Suitable production processes according to prior art for pigment granules are, for example, spray granulation (spray drying by disk or nozzle) and pelletizing (mixers, fluid-bed granulators, disks or drums).

The spray-drying granulation starts from pigment suspensions with the use of binders. Relevant processes are described in various protective rights; here water-soluble binders are used. Thus in DE-A 3 619 363, EP-A 0 268 645 and EP-A 0 365 046 the processes start from organic substances such as, for example, lignosulphonates, formaldehyde condensates, gluconic acids, sulphated polyglycol ethers, whereas in DE-A 3 918 694 and U.S. Pat. No. 5,215,583 the processes start from inorganic salts such as, for example, silicate and phosphate. A combination of spray granulation and pelletizing has also been described in EP-A 0 507 046. In DE-A 3 619 363 (column 3, lines 44–47) and EP-A 0 268 645 (column 7, lines 18, 19) the use of a compacting process is adopted. In this process a strong coherence of the particles is achieved by application of pressure, so that a good transportability but at the same time decreased properties of dispersibility are produced.

In EP-A 0 257 423 and DE-A 3 841 848, spray granulation using polyorganosiloxanes as hydrophobic, lipophilic additives is described. The spray-dryer mentioned generally leads to small particle sizes, that is, to a high proportion of fine material. This means that a significant proportion of the material is not obtained from the dryer as immediately usable granular material, but is first retained as fine material in the filter and has then to be returned to the process. The aftertreatment carried out to render the material hydrophobic, in the case of spray-dried products, results In granular material which flows very well but is exceptionally dusty.

EP-A 0 424 896 discloses the production of fine granular material low in dust, in a production operation in known intensive mixers. A low content of waxes in combination with emulsifier and wetting agents is used here by creating an aqueous dispersion. In the course of this water contents of from 20% up to over 50% are generally obtained. These granular materials must first of all be dried and separated from oversize and undersize material.

DE-A 31 32 303 describes inorganic pigment granules which are free-flowing and low in dust, which are mixed with binders rendered liquid by the action of heat and are granulated by a screening process with the use of a screening aid (pressure). About 10 to 20% of the throughput accumulates as fine material of <0.1 mm.

EP-A 0 144 940 discloses pigment granules low in dust which, starting from filtration sludge containing about 50% water, through the addition thereto of 0.5 to 10% of surfactants as well as mineral oil or waxes liquefying at 50 to 200° C., are mixed until lubrication point is reached. The procedure is carried out in intensive mixers, and if necessary the mixture is granulated and dried. Water is present in the end product in a quantity of 10 to 15%, which is disadvantageous for introduction into plastics.

Other processes are also limited in their application. Spray granulation, owing to the formation of droplets, requires the use of free-flowing and hence highly fluid suspensions. Consequently, for the drying process a greater quantity of water has to be evaporated than from highly pressed-out filtered pigment pastes during the frequently applicable fluid-bed drying. This leads to high energy costs. In the case of pigments previously produced by calcination, spray granulation involves an additional processing step with high energy costs. Moreover, in spray granulation a greater or lesser proportion of fine material accumulates, which has to be returned to the production unit.

Pelletizing, too, frequently exhibits disadvantages. Starting from pigment powder, it may be carried out in mixers under conditions of high turbulence, in the fluid-bed process or else by disk granulation and drum granulation. Common to all these processes is that the requirement for binder. in most cases water, is high, so that drying has to follow as an additional processing step. Here, too, granular materials of differing size are obtained, especially if insufficient binder is available for the quantity of powder or if the actual distribution is not optimal. Then a certain fraction may be too large for use as granular material, while on the other hand fractions which are excessively small and hence dust-forming are still present. A classifying of the granular material formed is therefore necessary, with oversize and undersize material being returned.

Disk granulation leads to granular materials having a wide particle size spectrum. Where this is undesirable because of the poor dispersibility of excessively large particles, the granulation process has to be monitored through intensive supervision by staff and the production of granular material has to be optimised by manual control of the quantity of grains. This is generally also followed by a classification and return of oversize and undersize material.

Extrusion processes from pastes lead to the formation of relatively solid granular materials during drying; owing to their size, these do not guarantee an optimal dispersibility.

DE-A 42 14 195 describes a process for coloring asphalt using inorganic pigment granules, with oils being used as binders. It is a simple granulation process.

In DE-A 4 336 613 and DE-A 4 336 612 inorganic pigment granules are produced from pigments by mixing with binders, compacting, rough grinding and granulating. The granular materials thus produced are not transportable satisfactorily by pneumatic means; during transportation a large quantity of dust is formed, which is undesirable.

SUMMARY OF THE INVENTION

It was accordingly the object of the present invention to provide a process which avoids the hitherto described disadvantages of spray granulation, extrusion granulation or pelletizing in their application to inorganic pigments and which provides sufficiently stable granular material which can be dosed, is low in dust and has a dispersibility as far as possible equally good as that of the powders used hitherto.

It has now been found that this object can be met by a multistep combination of the processing steps mixing, compacting, separation and optionally rounding.

DETAILED DESCRIPTION OF THE INVENTION

The invention provides a process for producing briquetted and pressed granular material from inorganic pigments and auxiliary substances, which is characterised in that a) one or more inorganic pigments are mixed with one or more of the auxilliary substances promoting processability, b) this mixture is subjected to a pressing or briquetting step, c) this pressed or briquetted product is comminuted, d) the comminuted product is divided up into two or more fractions, e) the fraction wherein at least 85% of the particles are larger than 80 µm, preferably larger than 100 µm, or are between 80 and 2000 µm, preferably between 100 and 1000 µm, is removed and optionally rounded in an additional step and the other fraction or fractions is/are transferred out of the process or returned.

Prior to step c) the pressed or briquetted product may be divided up preferably into two fractions (intermediate step x), in order then to comminute the coarse fraction. wherein at least 85% of the particles are larger than 500 µm. preferably 600 µm, in step c), and to divide the other, fine fraction, once again into two or more fractions in step d), separate from or together with the product from step c).

Preferably only the fine fraction from intermediate step x) is divided up into two or more fractions in step d), while the coarse fraction from intermediate step x) is comminuted in step c) and is then transferred out of the process as product.

Intermediate step x) may be carried out preferably by pneumatic classification or screening (mechanical separation). Preferably screening machines are used.

The comminuted product in d) is particularly preferably divided up into two fractions, with the fine fraction smaller than 80 µm being transferred out or returned to the process and the coarse fraction larger than 80 µm optionally being rounded in an additional step.

The comminuted product may also preferably be divided up into three fractions in step d), with the fine fraction and. the coarse fraction being transferred out of the process or returned to the process and the middle fraction between 80 and 2000 µm, particularly preferably between 100 and 1000 µm, most preferably between 100 and 500 µm, optionally being rounded in an additional step.

The granular materials preferably have a residual water content of less than 4 wt. %, particularly preferably less than 2 wt. %. This can be obtained if necessary by after-drying.

The rounding step under e) is preferably (carried out with the dust fraction removed.

The product formed by the rounding in step e) may preferably in addition be coated with auxiliary substances.

If a rounding step under e) is carried out, afterwards preferably a coarse fraction having particle sizes of >1500 µm can be separated and optionally returned to the process.

The inorganic pigments used are preferably iron oxide, titanium dioxide, chromium oxide, rutile mixed phase pigments and mixtures of these pigments with carbon black.

The inorganic pigment granules have bulk densities preferably of between 0.5 and 4.0 g/cm$^3$, particularly preferably between 0.5 and 2.0 g/cm$^3$. The granules mixed with carbon black have bulk densities preferably of from 0.3 to 1.5 g/cm$^3$.

Both inorganic and organic substances may be used as auxiliary substances.

The auxiliary substances used are preferably water, salts selected from among the phosphates, carbonates, nitrates, sulphates, chlorides, silicates, aluminates and borates, formates, oxalates, citrates and tartrates; polysaccharides, cellulose derivatives such as, for example, cellulose ethers, cellulose esters, phosphonocarboxylic acids, modified silanes, silicone oils, oils from biological cultivation (for example, rape oil, soy bean oil, maize oil, olive oil, coconut oil, sunflower oil), refined petroleum oils based on paraffins and/or on naphthenes, synthetically produced oils, alkylphenols, glycols, polyethers, polyglycols, polyglycol derivatives, protein fatty acid condensation products, alkylbenzenesulphonates, alkylnaphthalenesulphonates, lignosulphonates, sulphated polyglycol ethers, melamine formaldehyde condensates, naphthalene formaldehyde condensates, gluconic acid, polyhydroxy compounds or aqueous solutions thereof.

In addition, during mixing preferably emulsifiers, wetting agents and dispersing agents may be added in a quantity of from 0.01 to 5 wt. %, preferably from 0.01 to 3 wt. %, referred to the weight of the pigment used.

Suitable emulsifiers are in particular emulsifiers having HLB values of 7 to 40, particularly 8 to 18, for use in building materials containing aqueous systems, such as concrete, and consisting of alkyl or acryl groups and hydrophilic intermediate and end groups such as, for example, amides, amines, ethers, hyrdroxyl, carboxylate, sulphate, sulphonate, phosphate, amine salt, polyether, polyamide, polyphosphate. The substances may be used, according to their HLB value, individually or in combination.

Suitable wetting agents are in particular alkylbenzenesulphonates, fatty alcohol sulphates, fatty alcohol ether sulphates, fatty alcohol ethoxylate, alkylphenol ethoxylate, alkane sulphonates, olefin sulphonates.

Preferably melamine sulphonates, naphthalene sulphonates, metal soaps, polyvinyl alcohols, polyvinyl sulphates, polyacrylamides, fatty acid sulphates are used as dispersing agents.

To increase the stability or to assist in the processing of the granular material it may be beneficial finally to coat the granular materials with an additional layer. This layer can be produced by applying inorganic salts in solution, polyols, oils or waxes or polyethers, polycarboxylates or cellulose derivatives, preferably carboxymethyl celluloses.

Preservatives may also be added to the granular materials during mixing, in a concentration of from 0.01 to 1 wt. %, referred to the weight of the pigment. Examples which may be mentioned are formaldehyde-releasing compounds, phenolic compounds or isothiazolinone preparations.

Surprisingly, auxiliary substances for the pressed and briquetted granular materials, in particular if these are intended for incorporation into aqueous building materials systems such as cement mortar or concrete, can be not only water-soluble substances but also substances insoluble in water such as, for example, oils.

The auxiliary substances are added preferably in quantities of from 0.001 to 10 wt. % particularly preferably from 0.01 to 5 wt. %, most preferably from 0.1 to 3 wt. %, referred to pigment used.

The auxiliary substances can be added preferably compounded with other additives such as, for example, wetting agents, metal soaps, et cetera.

The pressing or briquetting step b) is preferably carried out by means of a roll press or matrix press and preferably at line forces of from 0.1 to 50 kN/cm, preferably 0.1 to 20 kN/cm.

In the pressing or briquetting (compacting, step b)) an important value is the pressing force (kN) per cm of roll width (line force). During compacting between rolls, a linear transfer of the pressing force is assumed, as a pressing surface cannot be defined and therefore a pressure (kN/cm$^2$) cannot be calculated.

The compaction is preferably carried out at low line forces. The line forces applied are in general preferably within the lower range of the commercially available equipment, between 0.1 and 50 kN/cm is preferred. The line forces are most preferably from 0.1 to 20 kN/cm. An example of commercially available equipment is the Pharmapaktor 200/50 from the firm Bepex GmbH, Leingarten/Germany.

The additional separating step x) is carried out preferably using screening machines such as, for example, drum screens, oscillating screens and vibrating screens.

The comminution can be effected by means of all the conventional commercial comminution units, such as crushers, toothed roll crushers, rolls equipped with frictional devices and screen granulators.

The comminution step c) is carried out preferably using screen granulators or screen-type mills, wherein the material is pressed through a passing screen having a mesh size of from 0.5 to 4 mm, particularly preferably from 0.5 to 2.5 mm, most preferably from 1 to 2 mm (so-called crushers). As is generally known, the motion of the rotors is circulating or oscillating, at a peripheral speed of from 0.05 m/sec to 10 m/sec, preferably from 0.3 to 5 m/sec. The distance between rotor and screen or breaker plate is from 0.1 to 15 mm, preferably from 0.1 to 5 mm, most preferably from 1 to 2 mm.

An example of the comminuting equipment which can be used is the Flake Crusher from the firm Frewitt, Fribourg/Switzerland.

After the comminution, the fine material smaller than 80 $\mu$m is separated off. The quantity of this fine material is preferably from 10 to 50 wt. %, particularly preferably 10 to 30 wt. %. The file material is preferably returned to step b). The remaining fraction is free-flowing, can be dosed, is stable, low in dust and readily dispersible. A further optimization can be achieved by additional rounding.

The rounding step e) is preferably carried out on a rotary disk, in a rotary drum or dragee drum, drum screens or similar units or in a fluid bed or in a screening plant. Here the dust fraction can be removed preferably by suction or, in the fluid bed, transported away with the air.

One of the advantages of the process according to the invention is that it is possible to start from dried and if necessary ground pigment powders. This is in particular especially economic when the pigment is produced by calcination. In the case of spray granulation, for example, a further slurrying and thereafter an additional drying step are necessary. It is moreover very expensive as regards energy to evaporate off again the water used for slurrying.

The process according to DE-A 4 336 613 or DE-A 4 336 612 leads, through pelletizing on the rotary disk, to round particles which are however inhomogeneous. They consist of a compact core and an external layer or layers formed thereon, which can become abraded. These products consequently form dust, especially when transported pneumatically, and the flow properties are not particularly good. The products obtained by the process according to the invention do not have these disadvantages, s they consist of homogeneous compact particles of uniform density and strength.

The granular materials produced by the process according to the invention are used for coloring building materials such as, for example, concrete, cement mortar, plasters and asphalt, and for coloring organic media such as paints, plastics and pigment pastes and for producing disperse dyes and slurries.

The granular materials produced according to the invention are particularly suitable for incorporation into dry cement mortar mixtures and into plasters.

In the multistep process according to the invention it is important that in the first step a sufficiently cohesive homogeneous material is produced by adding the auxiliary substance in a mixer. The briquetting or pressing then takes place in the second step.

The invention also provides a process for coloring building materials such as concrete or asphalt using inorganic pigments, which is characterised in that inorganic briquetted or pressed granular materials made from inorganic pigments and auxiliary substances, which have been produced by the process according to the invention, are mixed with the building material in a quantity of from 0.1 to 10 wt. %, preferably 1 to 5 wt. %, referred to cement.

Another preferred use. of the granular materials produced according to the invention is in disperse dyes and slurries.

The invention further provides a process for coloring organic media such as paint systems, plastics and pigment pastes using inorganic pigments, which is characterised in that inorganic briquetted or pressed granular materials made of inorganic pigments, which have been produced by the process according to the invention, are mixed with the organic medium in a quantity of from 0.1 to 10 wt. %, referred to organic medium.

The test of the dispersibility in building materials is carried out in cement mortar by the following method by measurement of the coloring strength on prisms produced from white cement:

Cement-quartz sand ratio 1:4; water-cement value 0.35; level of pigmentation 1.2%, referred to cement; mixer used, obtained from RK Toni Technik, Berlin, having 5 l mixing tub, structural type 1551, speed of rotation 140 rev/min; batch: 500 g cement. After 100 s, 3 samples of mixture (300 g) are taken and test pieces (5×10×2.5 cm) are prepared under pressure (300 bar). Curing of the test pieces: 24 hours at 30° C. and 95% atmospheric humidity with subsequent drying for 4 hours at 60° C. Color data measurement by Dataflash 2000, Datacolor International, Cologne, 4 measuring points per stone, per pigment mixture 12 measuring points. The average values obtained are compared with the values of a reference sample. The color difference $E_{ab}$ and the coloring strength (reference sample=100%) were assessed (DIN 5033, DIN 6174). The dispersibility is described as good at a difference in coloring strength of up to 5% compared with the reference sample, and as satisfactory at a difference of up to 10%.

The dispersibility in asphalt was tested by the following method:

The pigment/granular pigment together with a road bitumen of the type B 80 (commercial product from Shell AG) and aggregates is mixed in a heatable laboratory mixer (Rego mixer) at 180° C. for 60 seconds. Test pieces are prepared from the mixture by Marshall's method ("The Shell Bitumen Handbook, Shell Bitumen U.K., 1990, pages 230–232). Differences in shade in the Marshall test pieces are assessed calorimetrically against a preset comparative sample (Minolta Chromameter II, standard illuminant C, Cielab System, DIN 5033, DIN 6174) by comparison of the red values a*. Differences in the a* values of less than 0.5 units are indistinguishable visually.

The flow properties were tested by assessing the behavior on discharge from a funnel of 100 ml in volume and having a 6 mm opening, in accordance with ASTM Test D 1200-88. If the material flows freely, the flow properties are described as good. If a flow of material does not take place or does so only after tapping, the flow properties are considered to be inadequate.

The determination of the fine material as screen oversize is carried out on a VA screen in accordance with DIN 4188, having 80 µm mesh size on an air-jet screening machine of the type Alpine 200 LS. 20 g of the sample to be tested is used. The fine material is removed by suction for a running time of 5 minutes and the quantity of coarse fraction on the screen is reweighed.

The dispersibility of plastics is determined in accordance with a test in DIN 53 775, part 7: "Testing of coloring materials in plasticized polyvinyl chloride (PVC-P) materials; determination of the dispersing hardness by two roll milling":

The pigment to be tested is dispersed in PVC on a mixing roll at 160±5° C. The rolled sheet obtained is divided and one half is then exposed to increased shear forces by rolling at room temperature. The measure of the dispersibility in the case of colored pigments is the color difference $\Delta E$ in accordance with CIELAB (DIN 5033, 6174) between hot- and cold-rolled PVC sheets, and in the case of white pigments is the difference of the standard tristimulus values Y (DIN 5033) between hot- and cold-rolled PVC sheets. A readily dispersible pigment can be dispersed even at low shear forces, whereas the increased shear forces on rolling at low temperature are required in order to disperse a relatively indispersible pigment. The rule is therefore, the smaller the color difference $\Delta E$ or the difference in the standard tristimulus values Y, the better does the pigment disperse. The dispersibility is of great importance particularly in the case of granular materials, as the particles of granular material to be dispersed in the plastics material have first of all to be divided. For granular materials a dispersibility is sought which is as good as that of the corresponding pigment powders, so that the characteristic values $\Delta E$ or Y for powders and granular material should not differ greatly.

The measurement of fine dust particles for determining the stability of granules is carried out in accordance with DIN 55992. The dust-forming properties of the granules can be determined using a Heubach "Dustmeter". The quantity of fine dust particles issuing from a rotating drum, through which a stream of air of a specific intensity is passed is determined gravimetrically by means of a glass fibre filter. By carrying out measurements after varying periods of exposure the progress of the formation of dust can be determined as a function of mechanical stress.

EXAMPLES

The present invention is explained in more detail below by means of Examples, but should not be regarded as limited thereby.

Example 1 (comparison)

50 kg of iron oxide red Bayferrox 130 (commercial product of Bayer AG) was mixed with 1% of lignosulphonate and 1% of machine oil V 100 in a mixer for 10 minutes. The mixture was pressed on a compactor 200/50 (firm Bepex, Leingarten) at ca. 10 kN (2 kN/cm) and then comminuted on a crusher (firm Frewitt, Fribourg, Switzerland) by means of a screen of 1.5 mm mesh size. The proportion larger than 80 µm was ca. 95%. The dispersibility in concrete, compared with the starting powder, was 100%. The bulk density was 1.07 g/cm³. The material forms a large amount of dust and does not flow out of a funnel having a 6 mm opening.

Example 2

0.6 kg of the rough-ground (see Example 1) and subsequently screened material (coarse fraction through a screen having a mesh size of 300 µm) was rounded in a fluid bed. The apparatus used is a glass tube of 90 mm in diameter and 665 mm in height equipped with a fritted-glass filter G 0 as, an air diffuser. The quantity added (4% of the proportion smaller than 80 µm) is swirled by a quantity of air of 22 Nm³/h for 10 minutes and 30 minutes respectively. The material abraded off is discharged by a stream of air. 20% and 30% of the material respectively was discharged as fine material. The dispersibility in cement mortar, at a relative coloring strength of 95% and 94% respectively, is good. The material flows well. The dust fraction is very small (dust measurement using the Heubach Dustmeter in accordance with DIN 55 992), the bulk density is higher than that of the starting material. 100% of the material is larger than 125 µm, as shown by a control screening. The average particle size is ca. 600 µm. The quantity separated off as fine material is 34% and 42% respectively.

Example 3

1 kg of the material, after comminution by the crusher (see Example 1) is placed in a drum screen of 220 mm in diameter, 310 mm in length and having a mesh size of 300 µm, operating at 10 revolutions per minute (rev/min), which is contained in a closed housing. Suction is applied at the top of the housing, which is ca. 35 l in volume. After a running time of 10 minutes and 30 minutes respectively, 30% and 37% respectively are removed by suction. The material of irregular shape exhibits distinct rounding. Dispersibility and flow properties are good. The tendency to form dust is low. A further rolling (after-rounding) on a rotary disk (40 cm diameter, 42 rev/min, 47° inclination) brings no further improvements.

Example 4 (Comparison)

The rough-ground material (see Example 1) is subsequently rolled by after-rolling for 15 minutes on the rotary disk (40 cm in diameter, 42 rev/min, 47° inclination) under suction. The yield is 95%. The dispersibility is good. The material flows well. The proportion larger than 80 µm is 100%. However the formation of dust in the dustmeter, at ca. 300 mg, is very poor. In comparison, the dust values of the granular materials from Example 2 and Example 3 in the dustmeter are ca. 100 mg.

Example 5

250 g of Corasol C30 carbon black (a Degussa trade product) respectively 250 g of Monarch 800 carbon black (a Cabot Corp. trade product) and 250 g of Bayferrox 330 iron oxide black (a Bayer AG trade product) were mixed for 18 minutes in a mixer with ammonium lignosulphonate and V 100 machine oil in different quantities. The mixture was moulded once or twice using various linear forces in a compactor of type WP50N (from the Alexanderwerk in Remscheid) and then comminuted in an RFG fine granulator (from the Alexanderwerk in Remscheid) using a screen with a mesh size of 1.5 mm. The comminuted product was separated into two fractions using a screen with a mesh size of 250 µm. The fraction larger than 250 µm was tested and displayed good flowability (the corresponding powder mixture had poor flowability). The remaining data for the fraction and the starting powders are contained in Table 2. The relative color intensity was measured in comparison with a corresponding mixture of the starting powder.

TABLE 1

| Sample | Comments on sample | Yield [%] | Dispersibility* | Dust measurement [mg] | Discharge time [s] | Bulk density [g/cm$^3$] | Screen analysis > 80 µm |
|---|---|---|---|---|---|---|---|
| Example 1 | pressed and comminuted | 100 | 100 | — | does not flow | 1.07 | 95 |
| Example 2 | screened: 10 min. in the fluid bed | 66 | 95 | 104 | 32 | 1.14 | 100 |
|  | screened: 30 min. in the fluid bed | 58 | 94 | 85 | 32 | 1.17 | 100 |
| Example 3 | 10 min. through drum screen | 70 | 96 | 95 | 32 | 1.10 | 100 |
|  | 30 min. through drum screen | 63 | 94 | 71 | 30 | 1.11 | 100 |
|  | 10 min. through drum screen plus 15 min. rolling on rotary disk | 70 | 95 | 96 | 30 | I.11 | 100 |
| Example 4 | not screened, 15 min. rolling on rotary disk | 95 | 98 | 304 | 29 | 1.22 | 100 |

*in cement mortar; rel. color intensity [%]

TABLE 2

|  | Additives | Linear force [kN/cm] | Bulk density [g/ml] | Yield [%] | Outflow time [sec.] | Rel. color intensity in concrete [%] |
|---|---|---|---|---|---|---|
| Monarch 800 carbon black powder | — | — | 0.20 | — | non-flowable | 100 |
| Bayferrox 330:Monarch 800 50:50; granules | 2% LS + 1% oil | 7 | 0.6 | 61 | 34 | 83 |
| Corasol C 30 carbon black powder | — | — | 0.40 | — | non-flowable | 100 |
| Bayferrox:Corasol 50:50; granules | 8% LS + 1% oil | 5 | 0.6 | 54 | 31 | 96 |
| Bayferrox 330 iron oxide powder | — | — | 0.7 | — | non-flowable | 100 |

LS—ammonium lignosulfonate
oil—machine oil V 100

What is claimed is:

1. Homogeneous compacted granular material comprising inorganic pigment and up to 10% by weight of auxiliary substance, referred to the pigment used, produced by a process comprising the steps of
   a) mechanically mixing one or more inorganic pigment powders with one or more auxiliary substances promoting processability to produce a cohesive, homogeneous mixture,
   b) subjecting this mixture to a compacting step to produce a compacted product,
   c) comminuting the compacted product to produce a comminuted product,
   d) dividing the comminuted product into two or more fractions, and
   e) removing a first fraction of particles as product.

2. Homogeneous compacted granular material according to claim 1, wherein the inorganic pigment powder is selected from the group consisting of iron oxides, titanium dioxide, chromium oxides, rutile mixed phase pigments and mixtures of these pigments with carbon black.

3. Homogeneous compacted granular material according to claim 1, wherein the auxiliary substance is selected from the group consisting of water, salts selected from among the phosphates, silicates, aluminates, borates; polysaccharides and cellulose derivatives, oils from biological cultivation, refined petroleum oils based on paraffins and/or naphthenes, synthetically produced oils, alkylphenols, glycols, polyethers, polyglycols, polyglycol derivatives, protein fatty acid condensation products, alkylbenzenesulphonates, alkylnaphthalenesulphonates, lignosulphonates, sulphated polyglycol ethers, melamine formaldehyde condensates, gluconic acid, and polyhydroxy compounds.

4. Homogeneous compacted granular material according to claim 3, wherein the auxiliary substance is from 0.001 to 10% by weight, referred to the pigment used.

5. Homogeneous compacted granular material according to claim 1, wherein the first fraction has at least 85% of the particles larger than 100 $\mu$m.

6. Homogeneous compacted granular material according to claim 1, wherein the first fraction has at least 85% of the particles between 80 and 2000 $\mu$m.

7. Homogeneous compacted granular material according to claim 6, wherein the first fraction has at least 85% of the particles between 100 and 1000 $\mu$m.

8. A process for producing homogeneous compacted granular material comprising inorganic pigment and auxiliary substance, comprising the steps of
   a) mechanically mixing one or more inorganic pigment powders with one or more auxiliary substances promoting processability to produce a cohesive, homogeneous mixture,
   b) subjecting this mixture to a compacting step to produce a compacted product,
   c) comminuting the compacting product to produce a comminuted product,
   d) dividing the comminuted product into two or more fractions, and
   e) removing a first fraction of particles as product.

9. The process of claim 8, wherein the step of mechanically mixing produces a non-slurry.

10. The process according to claim 8, wherein the compacting step includes application of line forces of from 0.1 to 50 kN/cm.

11. The process according to claim 8, wherein the compacting step includes application of line forces of at least 2 kN/cm.

12. The process according to claim 8, wherein the compacting step comprises pressing once or twice with a roll press.

13. A process for producing homogeneous compacted granular material comprising inorganic pigment and up to 10% by weight of auxiliary substance, referred to the pigment used, comprising the steps of
   a) mechanically mixing one or more inorganic pigment powders with one or more auxiliary substances promoting processability to produce a cohesive, homogeneous mixture,
   b) subjecting this mixture to a compacting step to produce a compacted product,
   c) comminuting the compacted product to produce a comminuted product,
   d) dividing the comminuted product into two or more fractions, and
   e) removing a first fraction of particles as product.

14. The process of claim 13, wherein the step of mechanically mixing produces a non-slurry.

15. A process for producing homogeneous compacted granular material comprising inorganic pigment and auxiliary substance, comprising the steps of
   a) mechanically mixing one or more inorganic pigment powders with one or more auxiliary substances promoting processability to produce a cohesive, homogeneous mixture wherein the one or more auxiliary substances is selected from a group consisting of salts selected from among the phosphates, silicates, aluminates, borates; polysaccharides and cellulose derivatives, oils from biological cultivation, refined petroleum oils, alkylphenols, glycols, polyethers, polyglycols, polyglycol derivatives, protein fatty acid condensation products, alkylbenzenesulphonates, alkylnaphthalenesulphonates, lignosulphonates, sulphated polyglycol ethers, melamine formaldehyde condensates, gluconic acid, and polyhydroxy compounds,
   b) subjecting the mixture to a compacting step to produce a compacted product,
   c) comminuting the compacted product to produce a comminuted product,
   d) dividing the comminuted product into two or more fractions, and
   e) removing a first fraction of particles as product.

* * * * *